No. 684,824. Patented Oct. 22, 1901.
E. B. JEFFERIS.
SPADE HANDLE.
(Application filed May 7, 1901.)
(No Model.)
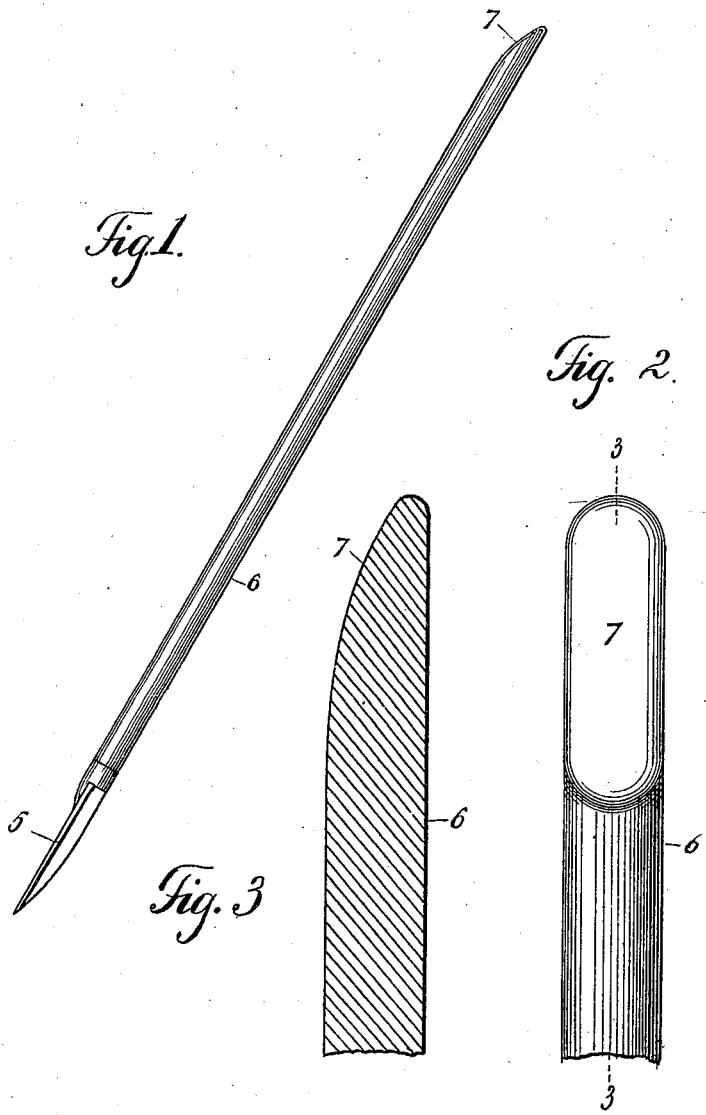
WITNESSES
INVENTOR
Eugene B. Jefferis
BY
ATTORNEYS

UNITED STATES PATENT OFFICE.

EUGENE BEAUHARNAIS JEFFERIS, OF HELENA, MONTANA.

SPADE-HANDLE.

SPECIFICATION forming part of Letters Patent No. 684,824, dated October 22, 1901.

Application filed May 7, 1901. Serial No. 59,075. (No model.)

*To all whom it may concern:*

Be it known that I, EUGENE BEAUHARNAIS JEFFERIS, a citizen of the United States, residing at Helena, in the county of Lewis and Clarke and State of Montana, have invented certain new and useful Improvements in Spade-Handles, of which the following is a full and complete specification, such as will enable those skilled in the art to which it appertains to make and use the same.

This invention relates to handles for spades, shovels, and other articles of this class; and the object of this invention is to provide a handle for an implement of the class specified the end of which is formed so as to facilitate the using of the spade or shovel; and with this and other objects in view the invention consists in a handle for an implement of the class specified constructed as hereinafter described and claimed.

The invention is fully disclosed in the following specification, of which the accompanying drawings form a part, in which the separate parts of my improvement are designated by the same reference characters in each of the views, and in which—

Figure 1 is a side view of a spade provided with a handle made according to my invention; Fig. 2, a plan view of the end of a handle which in practice is grasped by the hand, and Fig. 3 a section on the line 3 3 of Fig 2.

In the drawings forming part of this specification I have shown at 5 an ordinary spade provided with a handle 6, and the end of this handle opposite the spade is cut away or beveled, so as to form an inclined surface 7. By forming the end of the handle in this manner I provide means whereby pressure may be applied thereto without hurting the hand, which facilitates the operation of the spade or shovel and gives the operator a greater leverage than he would otherwise have in using the said spade or shovel. This form of construction enables the operator to grasp and securely hold the end of the handle with the right hand while using the left hand in the usual manner, and by turning the top portion of the end of the handle downwardly and backwardly, as shown, and by making the same flat, or substantially so, transversely I provide means whereby the pressure of the handle is exerted over the entire inner surface of the hand and not localized, as is the case with handles of this class as usually constructed.

Having fully described my invention, what I claim as new, and desire to secure by Letters Patent, is—

A handle for spades, shovels and other instruments the end of which is flattened and inclined backwardly and downwardly so as to form a flat bearing-surface for the hand, substantially as shown and described.

In testimony that I claim the foregoing as my invention I have signed my name, in presence of the subscribing witnesses, this 30th day of April, 1901.

EUGENE BEAUHARNAIS JEFFERIS.

Witnesses:
ALBERT JOHN GALEN,
JAMES BERNARD TONGHILL.